United States Patent [19]
Takashima et al.

[11] Patent Number: 5,969,634
[45] Date of Patent: *Oct. 19, 1999

[54] FM MULTIPLEXED BROADCAST RECEIVING APPARATUS

[75] Inventors: Susumu Takashima, Tachikawa; Kazuya Kawano, Kokubunji, both of Japan

[73] Assignee: Casio Computer Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/618,018

[22] Filed: Mar. 25, 1996

[30] Foreign Application Priority Data

Mar. 30, 1995 [JP] Japan ................................. 7-074146

[51] Int. Cl.$^6$ ................................................ H04B 7/00
[52] U.S. Cl. .................................. 340/825.44; 455/38.1; 455/38.2; 455/343
[58] Field of Search ..................... 340/825.44, 825.47, 340/825.72, 825.22, 825.04, 825.07, 825.2, 825.21, 185.54, 825.69; 455/38.1, 38.2

[56] References Cited

U.S. PATENT DOCUMENTS 4,630,271 12/1986 Yamada .
4,819,231 4/1989 Yamada .
5,296,849 3/1994 Ide ................................. 340/825.44
5,309,154 5/1994 Mun et al. ..................... 340/825.44
5,432,800 7/1995 Kuroda et al. .

FOREIGN PATENT DOCUMENTS 8-2044 10/1996 Japan .

*Primary Examiner*—Michael Horabik
*Assistant Examiner*—Anthony A. Asongwed
*Attorney, Agent, or Firm*—Frishauf, Holtz, Goodman, Langer & Chick, P.C.

[57] ABSTRACT

A selective call receiving apparatus for receiving FM multiplexed broadcasting signals which is designed to suppress consumed power by efficiently using a battery as a power supply. This apparatus has a reception circuit, an FM multiplex decoder, a subframe counter and a CPU. The reception circuit receives frames having plural pieces of subframes including ID data for a local terminal. The FM multiplex decoder detects a sync signal in each received subframe. The subframe counter counts the number of subframes in accordance with the detected sync signal. The CPU stops the operation of the reception circuit and FM multiplex decoder after causing the subframe counter to self-operate to perform the counting operation based on the sync signal detected in a continuous reception mode, and activates the reception circuit and FM multiplex decoder only when the count value of the subframe counter matches with a previously assigned subframe number and executes data processing including a process of determining if ID data in received data matches with that of the local terminal.

15 Claims, 11 Drawing Sheets

| PACKET NO. | 16 BITS | 16 BITS | 160 BITS | 14 BITS | 82 BITS | SUBFRAME NO. | LOWER 4 BITS OF ID |
|---|---|---|---|---|---|---|---|
| 1 | BIC1 | PREFIX | DATA PACKET 1 | CRC | PARITY | | |
| 2 | BIC1 | PREFIX | DATA PACKET 2 | CRC | PARITY | | |
| 3 | BIC1 | PREFIX | DATA PACKET 3 | CRC | PARITY | SUBFRAME 0 | 0000 |
| ⋮ | | | | | | | |
| 13 | BIC1 | PREFIX | DATA PACKET 13 | CRC | PARITY | | |
| 14 | BIC3 | PREFIX | DATA PACKET 14 | CRC | PARITY | SUBFRAME 1 | 0001 |
| ⋮ | | | | | | | |
| 29 | BIC3 | PREFIX | DATA PACKET 24 | CRC | PARITY | | |
| ⋮ | | | | | | | |
| 113 | BIC3 | PREFIX | DATA PACKET 80 | CRC | PARITY | SUBFRAME 7 | 0111 |
| ⋮ | | | | | | | |
| 128 | BIC3 | PREFIX | DATA PACKET 90 | CRC | PARITY | | |
| ⋮ | | | | | | | |
| 136 | BIC4 | PREFIX | PARITY PACKET | CRC | PARITY | | |
| 137 | BIC2 | PREFIX | DATA PACKET 96 | CRC | PARITY | | |
| 138 | BIC2 | PREFIX | DATA PACKET 97 | CRC | PARITY | | |
| 139 | BIC2 | PREFIX | DATA PACKET 98 | CRC | PARITY | SUBFRAME 8 | 1000 |
| ⋮ | | | | | | | |
| 149 | BIC2 | PREFIX | DATA PACKET 108 | CRC | PARITY | | |
| 150 | BIC3 | PREFIX | DATA PACKET 109 | CRC | PARITY | SUBFRAME 9 | 1001 |
| ⋮ | | | | | | | |
| 165 | BIC3 | PREFIX | DATA PACKET 119 | CRC | PARITY | | |
| ⋮ | | | | | | | |
| 249 | BIC3 | PREFIX | DATA PACKET 175 | CRC | PARITY | SUBFRAME 15 | 1111 |
| ⋮ | | | | | | | |
| 264 | BIC3 | PREFIX | DATA PACKET 185 | CRC | PARITY | | |
| ⋮ | | | | | | | |
| 272 | BIC4 | PREFIX | PARITY PACKET | CRC | PARITY | | |

FIG.3

RELATION BETWEEN SUBFRAME AND PACKET NO.

| SUBFRAME NO. | LOWER 4 BITS OF ID | PACKET NO. | NUMBER OF DATA PACKET |
|---|---|---|---|
| 0 | 0000 | 3 ~ 13 | 11 |
| 1 | 0001 | 14 ~ 29 | 11 |
| 2 | 0010 | 30 ~ 45 | 11 |
| 3 | 0011 | 47 ~ 62 | 11 |
| 4 | 0100 | 63 ~ 78 | 11 |
| 5 | 0101 | 80 ~ 95 | 11 |
| 6 | 0110 | 96 ~ 111 | 11 |
| 7 | 0111 | 113 ~ 128 | 11 |
| 8 | 1000 | 139 ~ 149 | 11 |
| 9 | 1001 | 150 ~ 165 | 11 |
| 10 | 1010 | 166 ~ 181 | 11 |
| 11 | 1011 | 183 ~ 198 | 11 |
| 12 | 1100 | 199 ~ 214 | 11 |
| 13 | 1101 | 216 ~ 231 | 11 |
| 14 | 1110 | 232 ~ 247 | 11 |
| 15 | 1111 | 246 ~ 264 | 11 |

FIG.4

| b1 | b2 | b3 | b4 | HEX | SERVICE ID | DATA PACKET STRUCTURE | RECEPTION MODE |
|---|---|---|---|---|---|---|---|
| 0 | 0 | 0 | 0 | 0 | UNDEFINED | - | - |
| 1 | 0 | 0 | 0 | 1 | TRANSFER NO.1 MODE | STRUCTURE 1 | SEQUENTIAL RECORDING |
| 0 | 1 | 0 | 0 | 2 | TRANSFER NO.2 MODE | STRUCTURE 1 | RECORDING |
| 1 | 1 | 0 | 0 | 3 | TRAMSFER NO.3 MODE | STRUCTURE 1 | RECORDING |
| 0 | 0 | 1 | 0 | 4 | TRAMSFER NO.4 MODE | STRUCTURE 1 | RECORDING |
| 1 | 0 | 1 | 0 | 5 | TRANSFER NO.5 MODE | STRUCTURE 1 | RECORDING |
| 0 | 1 | 1 | 0 | 6 | TRANSFER NO.6 MODE | STRUCTURE 1 | RECORDING |
| | | | | 7~C | USING SECTION (PAGING MODE) | - | - |
| 0 | 0 | 1 | 1 | D | ADDED INFORMATION | (STRACTURE 2) STRACTURE 2 | (RECORDING) SEQUENTIAL/RECORDING |
| 1 | 0 | 1 | 1 | E | AUXILIARY SIGNAL | STRACTURE 2 | RECORDING |
| 0 | 1 | 1 | 1 | F | OPERATION SIGNAL | STRACTURE 1 | - |

FIG.6

| BIC1 | : | 0001 | 0011 | 0101 | 1110 |
| BIC2 | : | 0111 | 0100 | 1010 | 0110 |
| BIC3 | : | 1010 | 0111 | 1001 | 0001 |
| BIC4 | : | 1100 | 1000 | 0111 | 0101 |

TRANSFER ORDER ⟶

BIT PATTERN OF BLOCK ID CODE

FIG.7

FM MULTIPLEXED BROADCAST RECEIVING APPARATUS

BACKGROUND OF THE INVENTION

1. Field of the Invention

The present invention relates to a selective call receiving apparatus suitable for use in broadcasting or communication, and specifically in FM multiplexed broadcasting.

2. Description of the Related Art

Recently services which multiplex information, including characters and other display information, on an FM broadcast program and broadcast the resultant information have been put into practice. FIG. 10 illustrates the principle of such multiplexing of FM multiplexed broadcasting.

A sum signal ((L+R) signal; main channel signal) of a left (L) signal and right (R) signal and a difference signal ((L−R) signal) are generated from L and R audio signals. Those signals are all limited to a frequency band of 15 KHz. A carrier which belongs to the difference signal ((L−R) signal) and has a frequency of 38 KHz (2 fp), twice the frequency of a pilot signal fp, is subjected to carrier suppression amplitude modulation to generate a subchannel signal. Then, the main channel signal, the pilot signal fp having a frequency of 19 KHz, and the subchannel signal are added together to prepare a stereo composite signal for FM audio broadcasting.

A multiplexed signal is in the frequency band where the baseband frequency is equal to or greater than 53 KHz and equal to or less than 100 KHz, and has a subcarrier frequency of 76 KHz (4 fp), four times the frequency of the pilot signal. This multiplexed signal is subjected to L-MSK (Level controlled Minimum Shift Keying) modulation, and the resultant signal is frequency-multiplexed on the stereo composite signal. Therefore, a carrier of a predetermined frequency is frequency-modulated by a signal obtained by adding the main channel signal, pilot signal, subchannel signal and subcarrier frequency signal (multiplexed signal) together, thereby yielding an FM multiplexed broadcast wave.

When the modulation level of the difference signal (L−R) signal) is large, the interference on multiplexed signals increases. The interference noise to audio signals is likely to be detected when the modulation of audio signals is small. In this respect, each multiplexed signal is subjected to L-MSK modulation so that the modulation level of the multiplexed signal is changed between 4% and 10% in accordance with the modulation level of the L-R signal, as shown in FIG. 11.

The details of this technique are described in Examined Japanese Patent Publication (Kokoku) No. Hei 8-2044.

The transfer rate of multiplexed signals is 16 Kbps of which 6.83 Kbps are used as a data area and the remaining 9.17 Kbps are used for error correction.

Used in this error correction is a product code ((272, 190) shortened difference set cyclic code) obtained by breaking down a single code to symbols which are arranged in the horizontal and vertical directions, as shown in FIG. 12. The details of this technique are described in U.S. Pat. No. 4,630,271, U.S. Pat. No. 4,819,231 and U.S. Pat. No. 5,432,800.

For example, a single broadcasting station can broadcast a maximum of 256 programs as such multiplexed information.

Recently, there are paging services (selective call services) which use this FM multiplexed broadcast system. One such above-described FM multiplexed broadcast system is called DARC (DAta Radio Channel). This system has been developed in Japan.

Other FM multiplexed broadcast systems include the RECEPTER system (HSDS=High speed Subcarrier Data System) which is locally employed in the U.S.A. and RDS (Radio Data System) which is locally employed in Europe.

In providing paging services using FM multiplexed broadcast, a receiving apparatus should always be powered on. It is therefore important to reduce the power consumption.

SUMMARY OF THE INVENTION

Accordingly, it is an object of the present invention to provide a selective call receiving apparatus which has low power consumption.

To achieve the above object, according to first aspect of this invention, there is provided a selective call receiving apparatus comprising:

reception means for receiving a frame having a plurality of subframes including call data of a terminal to be called;

decoding means for decoding said frame received by said reception means;

timing discrimination means for discriminating a timing at which a subframe assigned to said apparatus is transmitted; and control means responsive to said timing discrimination means for operating said reception means and said decoding means to receive and decode said subframe at said timing at which a subframe assigned to said apparatus is transmitted.

According to second aspect of this invention, there is provided a selective call receiving apparatus comprising:

reception means for receiving a frame having a plurality of subframes including call data of a terminal to be called;

decoding means for decoding said frame received by said reception means;

timing discrimination means for discriminating a timing at which a subframe assigned to said apparatus is transmitted; and control means responsive to said timing discrimination means for determining if call data included in a subframe decoded by said decoding means matches with call data assigned to said apparatus at a timing at which a subframe previously assigned to said apparatus is transmitted, and processing data included in said subframe only when there is a match.

According to the third aspect of this invention, there is provided an FM multiplexed broadcast receiving apparatus comprising:

reception means for receiving an FM multiplexed broadcast radio wave including a frame having a plurality of subframes each specifying a type of a service;

timing discrimination means for discriminating a timing at which a subframe assigned with a desired service is transmitted; and control means responsive to said timing discrimination means for receiving and processing data included in a subframe at a timing at which a subframe assigned with said desired service is transmitted.

BRIEF DESCRIPTION OF THE DRAWINGS

FIG. 3 is a diagram depicting how frame data in FM multiplexed broadcast according to this embodiment is divided into a plurality of subframes;

FIG. 4 is a diagram illustrating the relationship between packet numbers for a plurality of subframes and the lower four bits of ID according to this embodiment;

FIG. 6 is a diagram showing the contents of a service ID code according to this embodiment;

FIG. 7 is a diagram showing a bit pattern of a block ID code according to this embodiment;

DETAILED DESCRIPTION OF THE PREFERRED EMBODIMENT

An FM multiplexed broadcast receiving apparatus according to one embodiment of the present invention will now be described with reference to the accompanying drawings. The FM multiplexed broadcast receiving apparatus is adapted for a paging communication system realized by FM multiplexed broadcast employing the DARC (DAta Radio Channel) system.

Figure 1:
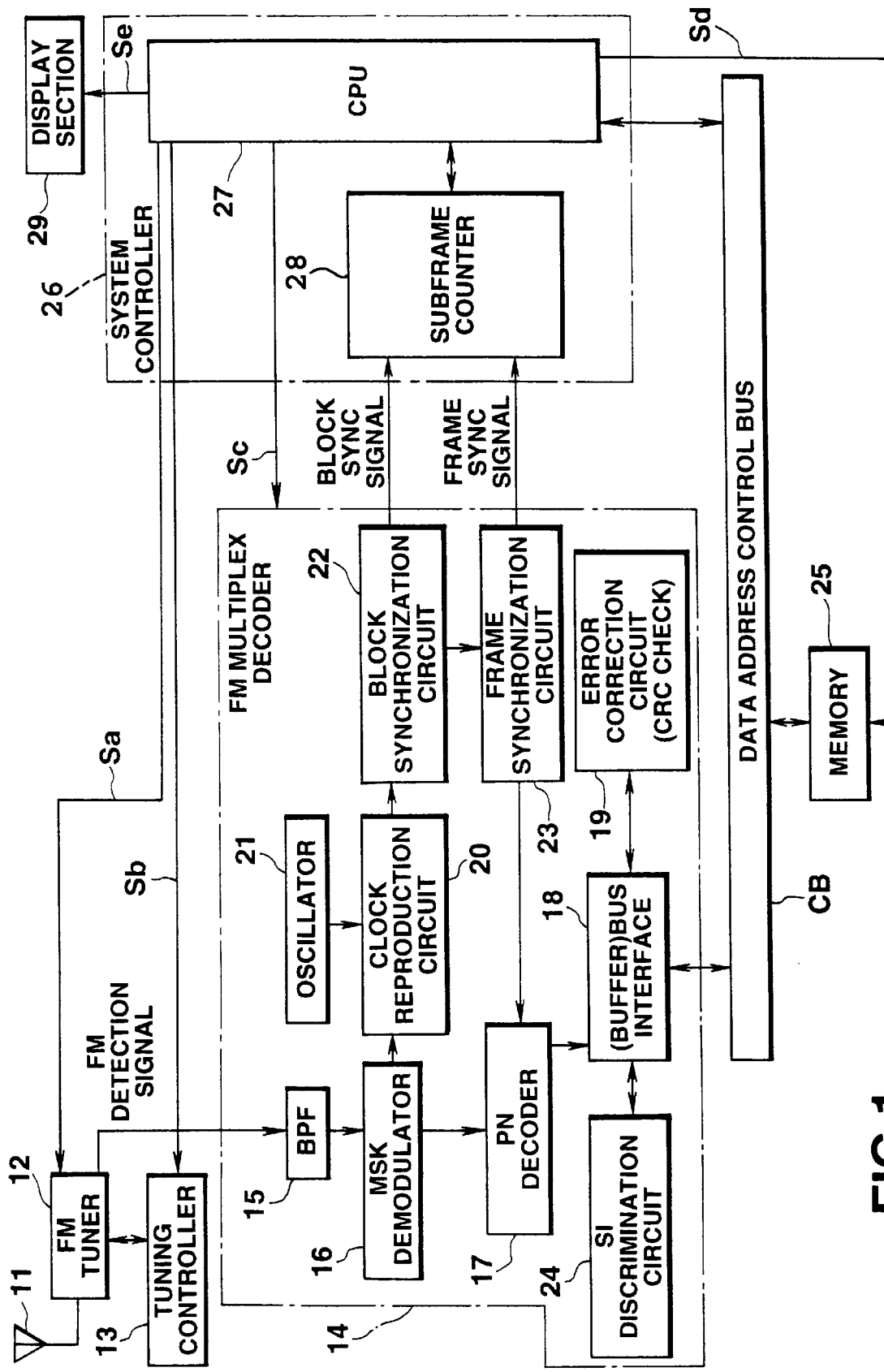
FIG. 1 is a block diagram illustrating the circuit structure of one embodiment of the present invention.

FIG. 1 shows the schematic structure of this receiving apparatus. An antenna 11 is connected to an FM tuner 12. The FM tuner 12 selectively tunes to the FM multiplexed broadcast radio wave received by the antenna 11 and demodulates the wave to acquire an FM detection signal, under the control of a tuning controller 13. The Tuning controller 13 may be constituted of a single chip microcomputer.

The FM detection signal obtained by the FM tuner 12 is supplied into an FM multiplex decoder 14 where only a component of 76 KHz band of the subcarrier frequency is extracted by a bandpass filter (BPF) 15. This component is then subjected to delay detection by an MSK demodulator 16 in accordance with the modulation level of the stereo audio signal, thereby reproducing digital data.

The reproduced digital data, excluding BIC (Block Identification Code), is descrambled by a PN decoder 17 based on a frame sync signal from a frame synchronization circuit 23 (which will be discussed later). Then, the descrambled signal (data) is sent to a bus interface 18 which serves as a buffer.

The data sent to the bus interface 18 undergoes error correction and CRC (Cyclic Redundancy Code) check by an error correction circuit 19. The resultant digital data is stored in a memory 25 via a data address control bus CB and is also transferred to a service identification (ID) code discrimination circuit (indicated by "SI discrimination" in the diagram) 24 in the FM multiplex decoder 14.

The service ID code discrimination circuit 24 discriminates if service ID information included in the digital data indicate a paging service. The discrimination result is sent via the bus interface 18 to the data address control bus CB.

The digital data reproduced by the MSK demodulator 16 is also sent to a clock reproduction circuit 20. This clock reproduction circuit 20 performs digital PLL on the digital data from the MSK demodulator 16 in response to a clock generated by an oscillator 21, to thereby reproduce a clock synchronous with the digital data. The clock reproduction circuit 20 sends the reproduced clock together with the digital data from the MSK demodulator 16 to a block synchronization circuit 22.

The block synchronization circuit 22 detects the BIC in the digital data by sampling the digital data with the reproduced clock to produce a block sync signal synchronous with a block in the data. The block synchronization circuit 22 then sends the block sync signal to a frame synchronization circuit 23 and a system controller 26.

The frame synchronization circuit 23 detects a change (transitional point) in the type of the BIC detected by the block synchronization circuit 22 to generate a frame sync signal, and sends the frame sync signal to the PN decoder 17 and the system controller 26.

The system controller 26 has a CPU 27 and a subframe counter 28. The block sync signal from the block synchronization circuit 22 in the FM multiplex decoder 14 and the frame sync signal from the frame synchronization circuit 23 are input to the subframe counter 28.

The subframe counter 28 is reset by the frame sync signal and sequentially counts up the block number in one frame in the currently receiving data in response to the block sync signal. The subframe counter 28 refers to, for example, a pre-recorded table to obtain a signal which becomes enabled when the count value becomes a block number in a subframe in the frame that is assigned to this counter, and sends this signal to the CPU 27.

The CPU 27 executes the general operation control of this receiving apparatus, including the discrimination of whether or not there is a private call. The CPU 27 accesses to the FM multiplex decoder 14 and memory 25 via the control bus CB, writes the received digital data into the memory 25, reads data from the memory 25, and prepares display data and display it on a display section 29 as needed. In accordance with the signal from the subframe counter 28, the CPU 27 sends control signals a to e to the FM tuner 12, tuning controller 13, FM multiplex decoder 14, memory 25 and display section 29 to control the enabling and disabling of those components.

This receiving apparatus is a portable type so that power is supplied to the aforementioned individual circuits from a battery and the control signals Sa to Se control the permission and inhibition of the power supply.

Further connected to the CPU 27 are a key input section and a tone generating section, though not particularly illustrated, so that the CPU 27 performs an operation according to the manipulation of various switches provided on the key input section and informs a user of a call being made to the receiving apparatus through the tone generating section upon reception of a private call.

The structure of data which is handled by the receiving apparatus will be described below.

Figure 2:
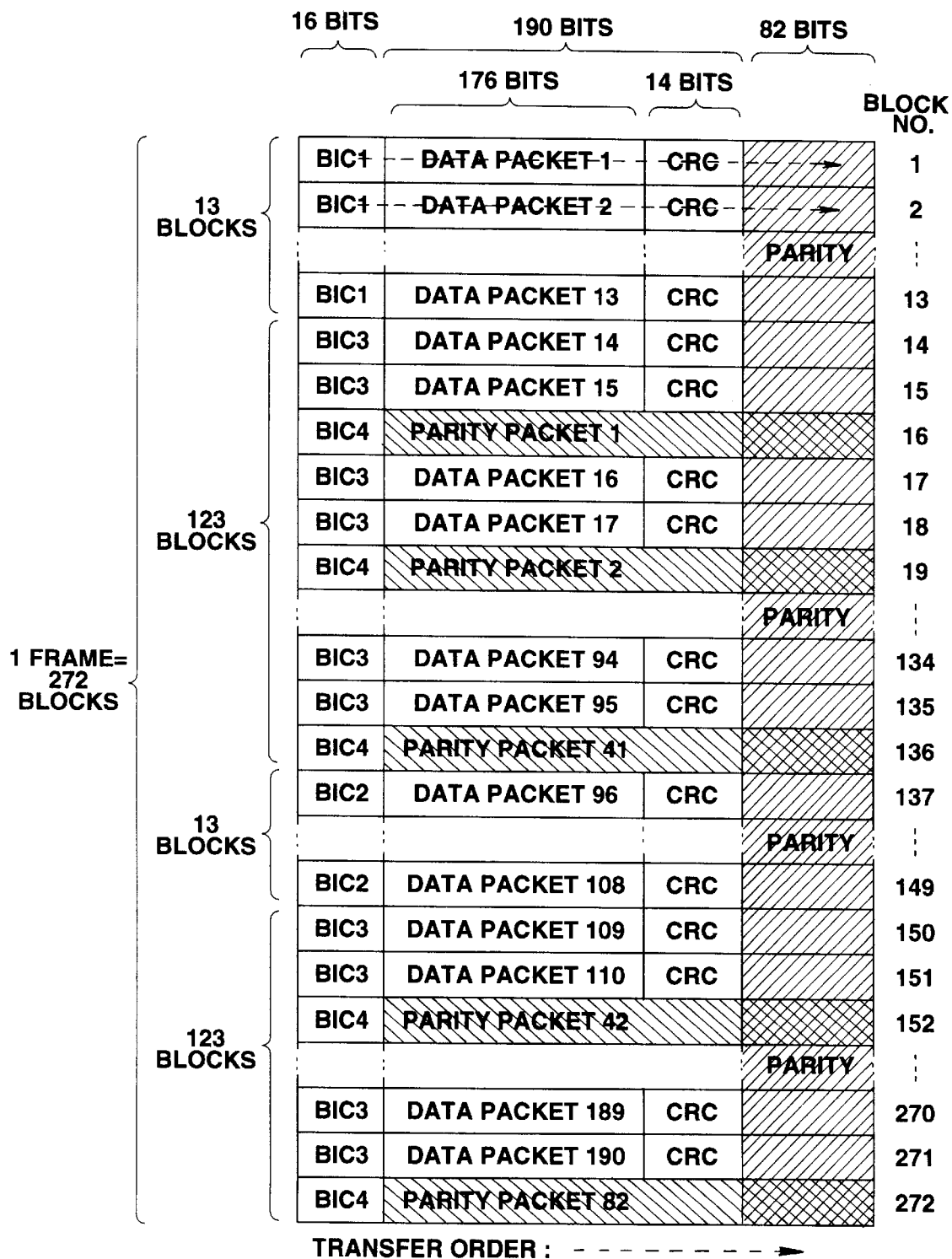
FIG. 2 is a diagram showing the structure of frame data of FM multiplexed broadcast according to this embodiment.

FIG. 2 shows the frame structure of an FM multiplexed broadcast wave transmitted from an unillustrated FM broadcasting station. Each frame is comprised of 272 blocks each having a 16-bit BIC affixed to the head as a block ID code. The 16-bit BIC is for establishing the block synchronization and frame synchronization.

Of the 272 blocks, 190 blocks serve as data packets for transferring data, and the remaining 82 blocks serve as parity packets for transferring parities in the column direction. The parity packets of the 82 blocks represent the vertical parities of the entire data packets, and are distributed as shown in FIG. 2 to cope with a burst error.

In this embodiment, 16 subframes are set in a single frame for a paging (private call) service as shown in FIG. 3.

In this case, as the first half of a frame, data packets included in packet No. 3 to packet No. 13 in the BIC1 are set as a subframe 0, data packets included in packet No. 14 to packet No. 29 in the BIC3 are set as a subframe 1, and likewise data packets included in packet No. 113 to packet No. 128 in the BIC3 are set as a subframe 7.

With the parity packets on and after packet No. 136 treated as the second half of the frame, data packets included in packet No. 139 to packet No. 149 in the BIC2 are set as a subframe 8, data packets included in packet No. 150 to packet No. 165 in the BIC3 are set as a subframe 9, and likewise data packets included in packet No. 249 to packet No. 264 in the BIC3 are set as a subframe 15.

The individual subframes No. 0 to No. 15 correspond to data of the lower four bits (lower fourth bit to first bit) in a 28-bit calling ID code which is given to each FM multiplexed broadcast receiving apparatus described above.

In other words, each FM multiplexed broadcast receiving apparatus belongs to any one of sixteen groups separated based on the data of the lower four bits in the ID code, and is designed to be able to receive the subframes that correspond to a group to which this apparatus belongs.

FIG. 4 illustrates the relationship between the packet numbers for subframes No. 0 to No. 15 and the lower four bits of the ID code. The bit pattern of a 16-bit BIC at the head of each block is shown in FIG. 7. Therefore, the timings of switching of the packet contents, the end of a frame and the start of a new frame are detected by a change in BIC1 to BIC4 as shown in FIG. 3.

Figure 5:
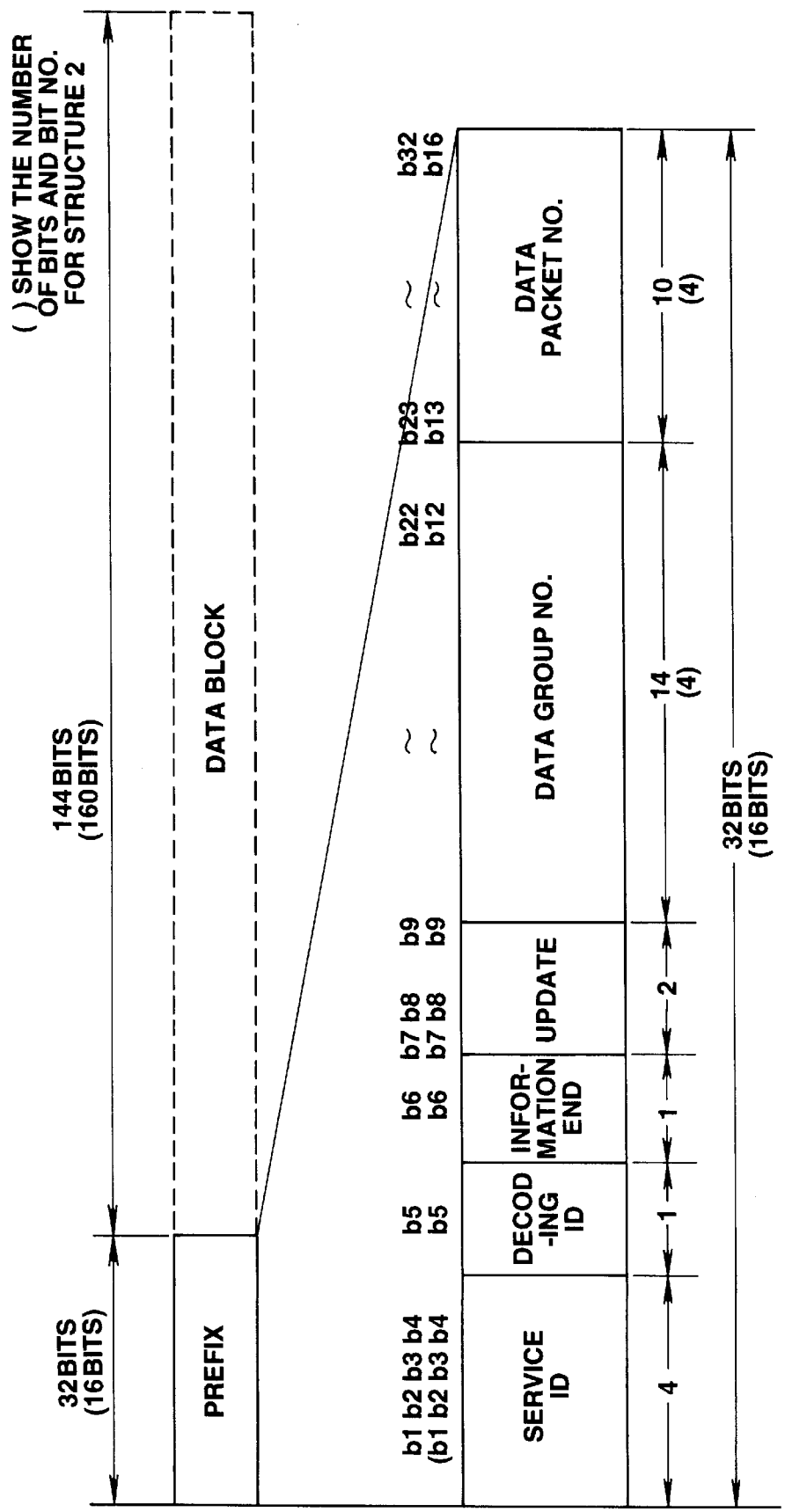
FIG. 5 is a diagram showing the schematic structure of a data packet constituting a subframe according to this embodiment.

Each of data packets constituting each subframe consists of a total of 176 bits, 32 bits or 16 bits of a prefix, 144 bits or 160 bits of a data block as shown in FIG. 5, followed by 14 bits of CRC and 82 bits of a parity.

Whether a prefix consists of 32 bits or 16 bits and whether a data block consists of 144 bits or 160 bits differs depending on the type of a service to be rendered. In this example, the combination of the 32-bit prefix and 144-bit data block is called "structure 1" and the combination of the 16-bit prefix and 160-bit data block is called "structure 2." The structure 2 is employed for a paging service as exemplified in this embodiment. (FIG. 5 and its description indicate the bit number and the number of bits in parentheses "( )" for the "structure 2.") Each 32 (16)-bit prefix consists of a 4-bit service ID code, a 1-bit decoding ID flag, a 1-bit information end flag, a 2-bit update flag, a 14 (4)-bit data group number and a 10 (4)-bit data packet number.

The 4-bit service ID code is for identifying the data contents of a data packet as shown in FIG. 6, and "0011" (C in a hexadecimal notation)" is in this example to indicate that the data packet is for the exclusive mode for a paging service. As shown in FIG. 6, data packets are previously set for either the "structure 1" or "structure 2" in association with the service ID codes.

The 1-bit decoding ID flag is set to "1" when an error corrected output should be made immediately after decoding only in the horizontal direction, and it is set to "0" when such an output should be made after decoding in both horizontal and vertical directions. Because each receiving terminal is designed to receive only subframes assigned to itself to save the battery power in a paging mode, the 1bit decoding ID flag is set to "1." The 1-bit information end flag is set to "1" when information ends in a given data group, and is set to "0" otherwise. The 2-bit update flag is incremented by "1" when a data group to be transferred with a given data group number is updated and the updated flag is sent out. When no updating has been made, the same flag as the previously transferred update flag is to be sent out.

The 4-bit data group number in a data packet with the "structure 2" at the time of executing a paging service consists of the lower four bits of the aforementioned call ID code. To ensure intermittent reception to save the battery power, the block numbers of frames to be transferred are previously determined for each data group number.

The 4-bit data packet number in a data packet with the "structure 2" at the time of executing a paging service indicates the number of a data packet to be transferred for each data group number. The data packet numbers are assigned in order from "0."

A 160-bit data block following the prefix in a data packet with the "structure 2" in a paging service mode is used as paging data, and includes the upper 24 bits of the 28-bit call ID code, given to each of the FM multiplexed broadcast receiving apparatuses, and message data or the like.

The operation of this embodiment will now be described.

First, the CPU 27 in the system controller 26 activates the FM tuner 12, tuning controller 13, FM multiplex decoder 14, memory 25 and display section 29 by their respective control signals Sa to Se to execute continuous reception.

The FM tuner 12 tunes to the radio wave of the channel which is currently conducting FM multiplexed broadcast, demodulates the wave to obtain an FM detection signal and sends the signal to the FM multiplex decoder 14 under the control of the tuning controller 13.

Only a component of 76 KHz band of the subcarrier frequency is extracted from the FM detection signal via the bandpass filter 15 in the FM multiplex decoder 14, and the resultant signal is then subjected to delay detection by the MSK demodulator 16 to reproduce digital data.

The reproduced digital data is sent to the clock reproduction circuit 20 which reproduces a clock synchronous with the digital data in response to the clock that is generated by the oscillator 21. The reproduced clock and the digital data are both sent to the block synchronization circuit 22.

Figure 8:
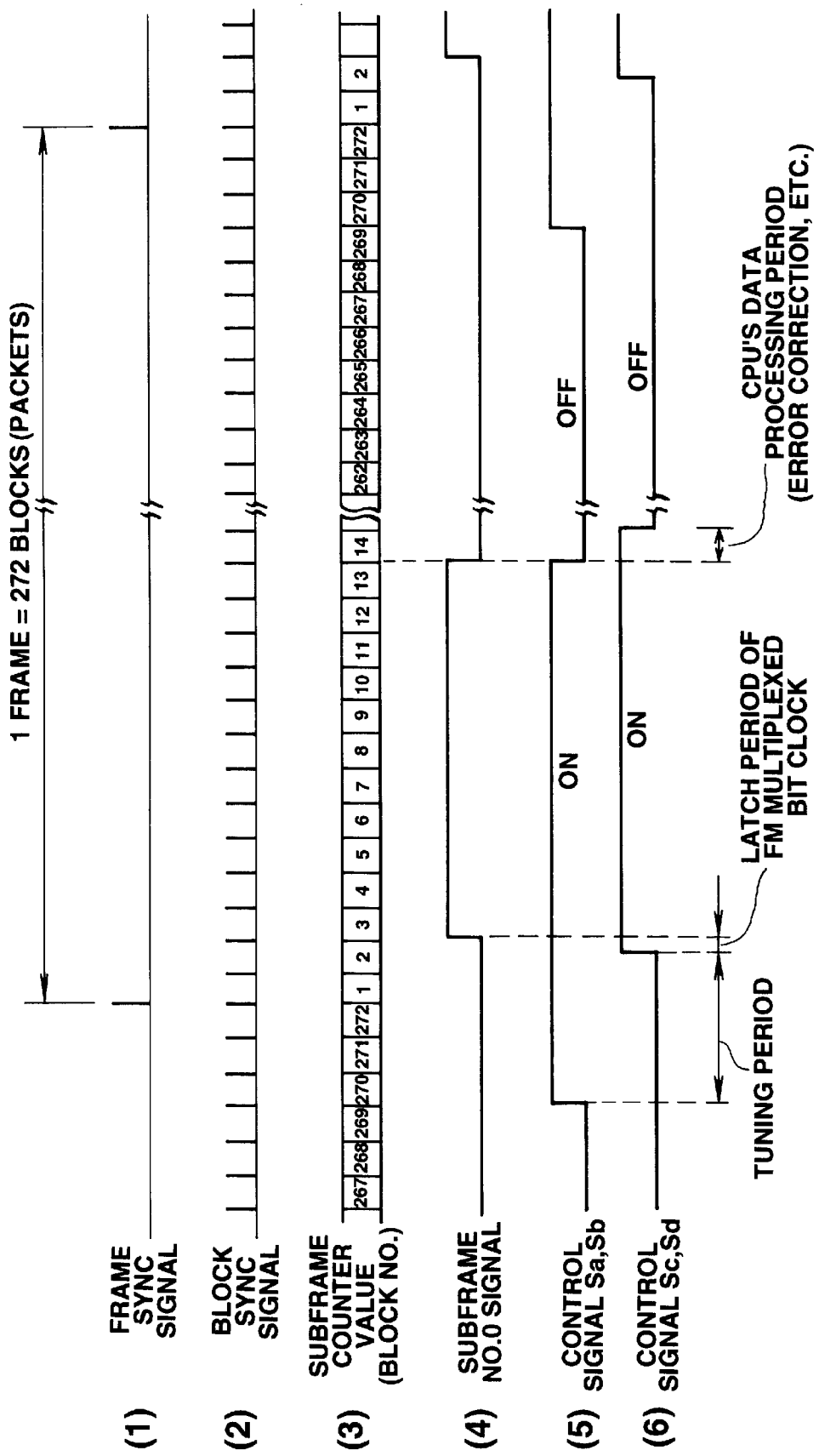
FIG. 8 is a timing chart illustrating the contents of an operation according to this embodiment.

The block synchronization circuit 22 detects the BIC in the digital data by sampling the digital data with the reproduced clock to produce a block sync signal (2), as shown in FIG. 8, synchronous with a block in the data, and then sends the block sync signal to the frame synchronization circuit 23 and the subframe counter 28 in the system controller 26.

The frame synchronization circuit 23 detects a transitional point in the type (BIC1 to BIC4) of the BIC in FIG. 7, detected by the block synchronization circuit 22, to generate a frame sync signal (2) as shown in FIG. 8, and sends the frame sync signal to the PN decoder 17 and the subframe counter 28 in the system controller 26.

The reproduced digital data is also sent from the MSK demodulator 16 to the PN decoder 17, which descrambles the digital data based on the frame sync signal from the frame synchronization circuit 23 and then sends the descrambled signal to the bus interface 18.

The digital data sent to the bus interface 18 is subjected to error correction and CRC check by the error correction circuit 19. The resultant data is sent out of the FM multiplex decoder 14 and is stored in the memory 25 via the data address control bus CB. The service ID code discrimination circuit 24 determines if the 4-bit service ID code at the head of the aforementioned prefix is "0011" indicating a paging service. The discrimination result is sent to the CPU 27 of the system controller 26 via the bus interface 18 and the data address control bus CB.

The subframe counter 28 is reset by the frame sync signal from the frame synchronization circuit 23, and sequentially counts up in response to the block sync signal from the block synchronization circuit 22 to thereby cyclically count from "1" to "272" as shown by subframe counter value (3) in FIG. 8. By referring to a pre-recorded table, the subframe counter 28 sends to the CPU 27 the signal which becomes active when the count value becomes a block number in the subframe that is assigned to this counter, e.g., any of block numbers "3" to "13" in the subframe "0," as shown by the subframe number 0 signal (4) in FIG. 8.

When detecting that the signal from the subframe counter 28 is enabled and discriminating that the service ID code in the prefix in currently receiving packet data indicate a paging mode from the discrimination result from the service ID code discrimination circuit 24, the CPU 27 reads a data block in the packet data to be stored in the memory 25 and determines if it matches with the upper 24 bits in the previously assigned 28-bit call ID code. When there is a match, the CPU 27 considers that a call is made to the local apparatus and performs predetermined processing, such as the generation of an alarm sound from the tone generating section and the display of message data, which, if present, should follow the call ID code, on the display section 29.

When the supply of the block sync signal from the block synchronization circuit 22 and the frame sync signal from the frame synchronization circuit 23 is interrupted, the subframe counter 28 automatically self-operates by an internal clock while keeping the previous timings and maintains a similar counting operation.

When determining that a call is not destined to the local apparatus and that the subframe counter 28 self-operates to be able to keep the counting operation, the CPU 27 in the system controller 26 enters an operation for intermittent reception from the above-discussed operation for continuous reception.

In the intermittent reception, the CPU 27 operates on the signal from the subframe counter 28 which is self-operating to maintain the counting operation. As shown in FIG. 8, the CPU 27 makes active the control signals Sa and Sb (5) at a timing preceding to a timing at which the signal from the subframe counter 28 changes to the ON state from the OFF state by the time equivalent to the sum of the tuning operation period needed from the activation of the FM tuner 12 and tuning controller 13 to the reception of FM multiplexed broadcast radio wave and the bit clock latching period in the FM multiplex decoder 14. In response to the signals Sa and Sb, the FM tuner 12 and the tuning controller 13 start the tuning operation. The CPU 27 keeps those signals Sa and Sb active until the signal from the subframe counter 28 changes to the OFF state from the ON state and keeps the control signals disabled until the same timing is reached in the next frame.

As shown in FIG. 8, the CPU 27 also makes active the control signals Sc and Sd (6) at a timing preceding to a timing at which the signal from the subframe counter 28 turns to ON state from OFF state by the time equivalent to the bit clock latching period in the FM multiplex decoder 14. In response to the control signals Sc and Sd, the FM multiplex decoder 14 and the memory 25 start the demodulation of digital data and data storage by the FM multiplex decoder 14 and memory 25, and the operation of discriminating the service ID code. The CPU 27 keeps those signals Sc and Sd active until the time of the data processing by the CPU 27 passes after the transition of the signal from the subframe counter 28 to the OFF state from the ON state, and keeps the control signals disabled until the same timing is reached in the next frame.

The control signal Se to the display section 29 is made active or inactive as needed.

While at least one of the control signals Sa and Sb or the control signals Sc and Sd is enabled, when determining that the service ID code in the prefix in the currently receiving packet data indicates the paging mode from the discrimination result from the service ID code discrimination circuit 24, the CPU 27 reads a data block in the packet data to be stored in the memory 25 and determines if it matches with the upper 24 bits in the previously assigned 28-bit call ID code. When it is determined that there is a match, the CPU 27 proceeds to the operation for continuous reception and performs predetermined processing.

When the operation of the subframe counter 28 which is self-operating in the intermittent reception mode does not match with the received signal, the CPU 27 should proceed to the operation for continuous reception and to correct the shift from the proper operation timing of the subframe counter 28 after which the CPU 27 should return to the operation of intermittent reception.

As is apparent from the above, only packet data in a subframe corresponding to the lower four bits in the call ID code in frame data, which is assigned to the local apparatus is received and at the other timings, only the system controller 26 operates while the other circuits in the reception system, such as the FM tuner 12, tuning controller 13 and FM multiplex decoder 14, stop operating, so that power which is otherwise wasted by those circuits of the reception system is suppressed and the battery as a power supply can be used efficiently.

This embodiment has been described as designed to execute intermittent reception to suppress the power which is otherwise wasted by the circuits in the reception system. When the power consumed by the circuits in the control system is greater than the power consumed by the circuits in the reception system, so much effect on the efficient use of the battery cannot be expected from this embodiment. In this respect, a description will now be given of another structure according to this embodiment of this invention as adapted to a receiving apparatus in which the circuits in the control system consumes greater power than the circuits in the reception system.

Figure 9:
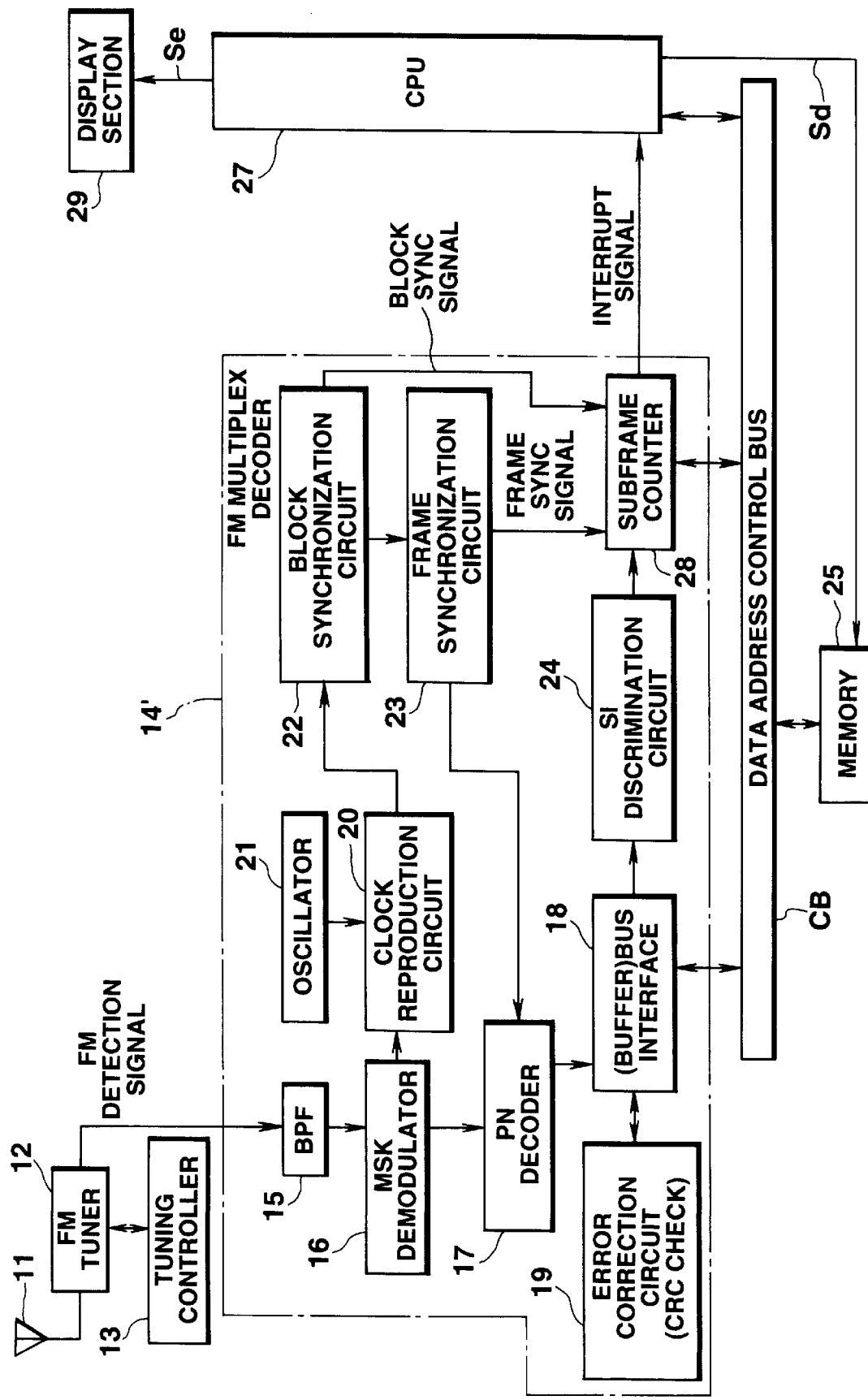
FIG. 9 is a block diagram exemplifying another circuit structure of this embodiment.
Figure 10:
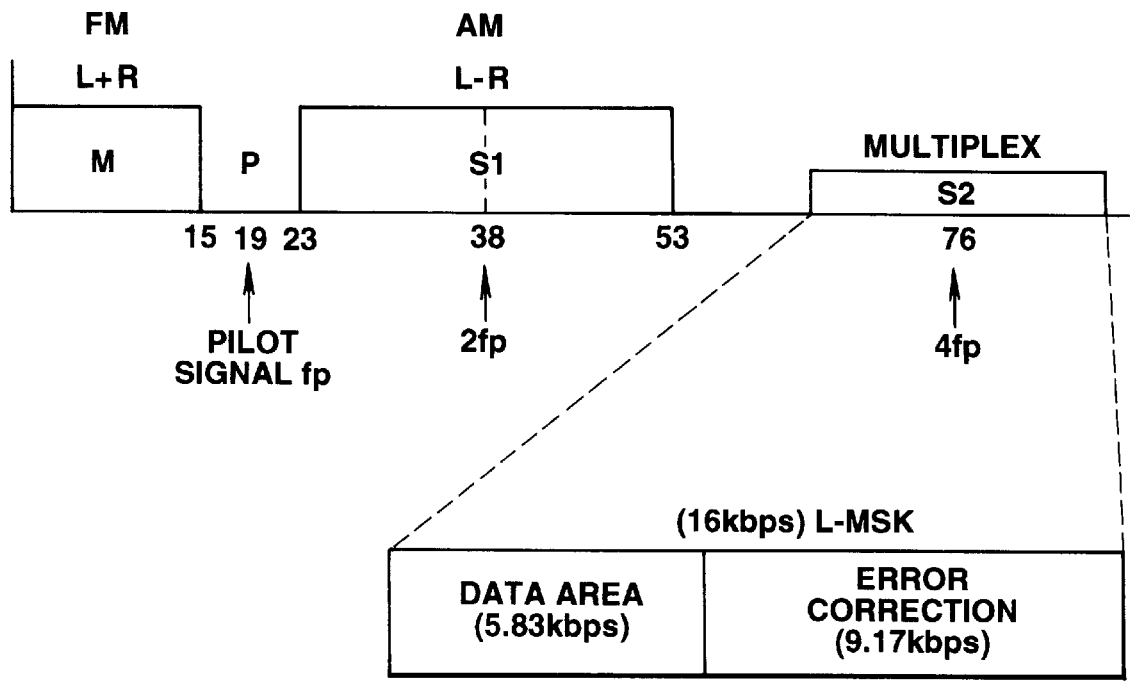
FIG. 10 is a diagram for explaining the principle of such multiplexing of FM multiplexed broadcasting.
Figure 11:
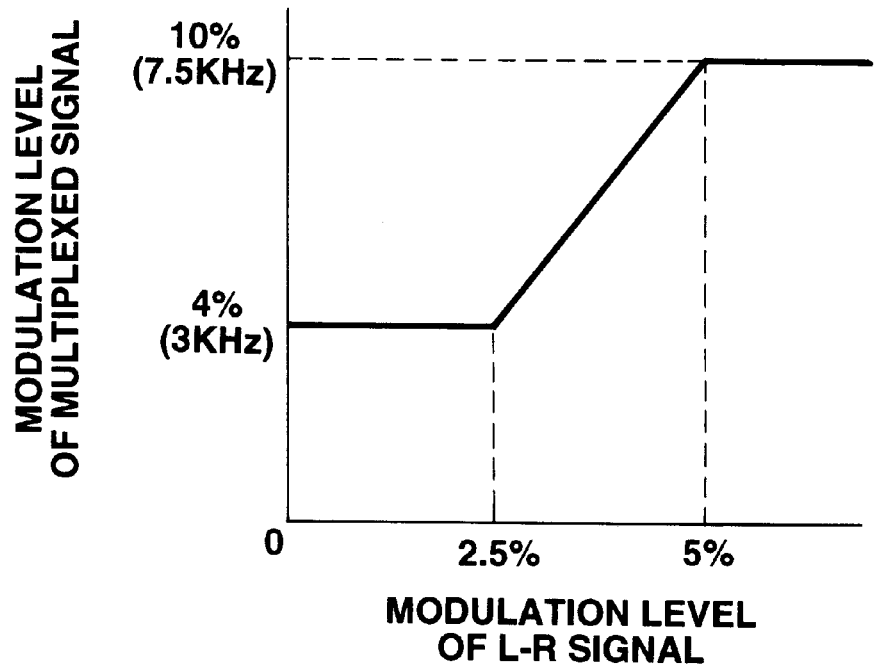
FIG. 11 is a graph for explaining the relating between the modulation level of multiplexed signal and the modulation level of the L–R signal.
Figure 12:
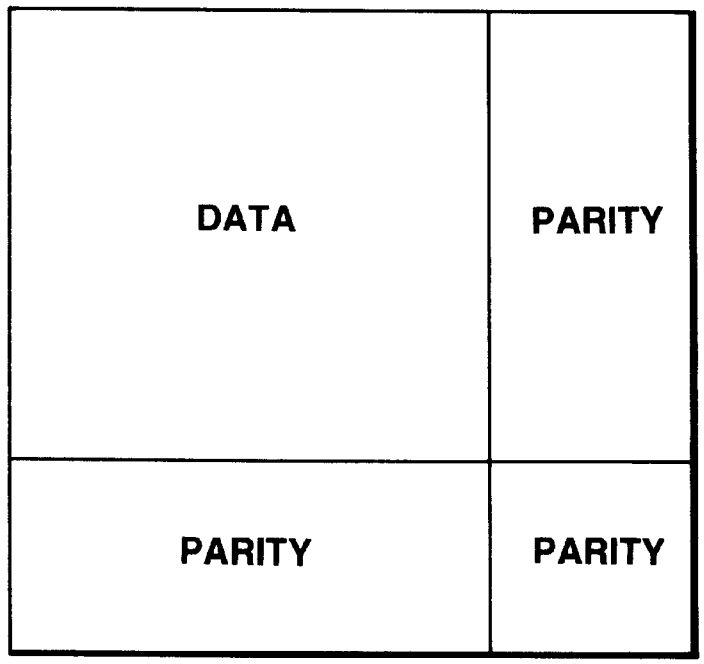
FIG. 12 is a diagram for explaining the shortened difference set cyclic code.

FIG. 9 exemplifies the circuit structure which is basically the same as the one shown in FIG. 1, so that like or same reference numerals are given in FIG. 9 to denote corresponding or identical components in FIG. 1 to avoid repeating their redundant descriptions.

The FM tuner 12, tuning controller 13 and FM multiplex decoder 14' operate to always perform the continuous reception operation, and the subframe counter 28 is provided in the FM multiplex decoder 14'.

This subframe counter 28 performs the same counting operation as the one in FIG. 1 upon reception of the block sync signal from the block synchronization circuit 22 and the frame sync signal from the frame synchronization circuit 23, and sends a count value equal to the block number to the data address control bus CB. The subframe counter 28 also refers to, for example, a prerecorded table to determine if the count value is the same as the block number in the subframe that is assigned to this counter.

When determining that the service ID code in the prefix in the currently receiving packet data indicates the paging mode from the discrimination result from the service ID code discrimination circuit 24, the subframe counter 28 sends an interrupt signal to the CPU 27 based on those two conditions being satisfied, to forcibly wake the CPU 27 which has been sleeping.

The CPU 27 is forcibly waken by the interrupt by the interrupt signal from the subframe counter 28 in the FM multiplex decoder 14', and enables the control signal Sd to the memory 25 to store a data block in packet data, which is sent via the data address control bus CB from the bus interface 18 of the FM multiplex decoder 14', in association with the block number which is the count value of the subframe counter 28. The CPU 27 also reads a data block in the packet data to be stored in the memory 25 and determines if it coincides with the upper 24 bits of the previously assigned 28-bit call ID code. When determining that there is a match, the CPU 27 immediately proceeds to the continuous reception operation and executes predetermined processing.

In short, while only the FM tuner 12, tuning controller 13 and FM multiplex decoder 14' as the circuits in the reception system operate for the continuous reception, power supply to the CPU 27 which is a control circuit to perform data processing is normally inhibited to suppress wasteful power consumption, and only when packet data in a subframe corresponding to the lower four bits in the call ID code assigned to the local apparatus is being received and when the packet data is associated with paging, an interrupt is made to wake up the CPU 27. It is therefore possible to suppress wasteful power consumption by the circuits of the control system and ensure the efficient use of the battery as the power supply.

Although the foregoing description of this embodiment has been given of the case where this invention is adapted to an FM multiplexed broadcast receiving apparatus which uses an FM multiplexed broadcast system to provide a paging service, this invention is not limited to this particular case. This invention may be adapted for a paging service which uses radio communication or for use in radio communication with a PIT (Portable Information Terminal) or PDA (Personal Data Assistance). This invention may be widely adaptable for various other types of communications and broadcasting systems in which case the frequency band and transmission system can be properly selected from those currently available.

According to this invention, as described above, in accordance with which circuits consume more power, the reception circuits that perform a reception operation or the control circuits that process data, the circuits which consume greater power are disabled until they become necessary, thus suppressing wasteful power consumption as much as possible and ensuring the efficient use of the battery as the power supply.

Although the foregoing description has been given of a pager service which uses FM multiplexed broadcasting, this invention may be adapted for the case where an arbitrary service to be transmitted by the FM multiplexed broadcasting is utilized.

For example, when a predetermined service assigned to the i-th subframe in each frame is used with low power consumption, the above-described technique should be used to allow a service type code in the i-th subframe in each frame to reproduce only the subframe associated with that service.

This invention is not limited to the above-described embodiment, but may be modified and adapted in various other forms within the scope or spirit of this invention. For example, the structure of the circuit blocks may be modified or corrected as needed.

What is claimed is:

1. An FM multiplexed broadcast receiving apparatus for receiving paging service information, comprising:

a reception circuit which receives frame data having a plurality of subframes including selective call data in the form of text information multiplexed on an FM radio wave, each of the subframes including a plurality of blocks each of which includes a substantial sync signal and a data packet;

a decoder which decodes the frame data received by said reception circuit and which reproduces the substantial sync signal and data included in the data packets;

a detector which detects the substantial sync signals which are synchronous with the plurality of blocks and generates block sync signals which are synchronous with the plurality of blocks; and a controller including an internal counter;

wherein said internal counter counts the block sync signals, detects, based on a count value thereof, a predetermined subframe which is previously assigned to said FM multiplexed broadcast receiving apparatus, and continues self-operation while keeping previous timings when supply of the block sync signals thereto is stopped;

wherein said controller (i) processes the data included in the data packets reproduced by said decoder, (ii) stops operation of said reception circuit, said detector, and said decoder after controlling said internal counter to perform a count operation of the block sync signals generated by said detector, and (iii) determines whether the selective call data received by said reception circuit matches predetermined selective call data previously assigned to the FM multiplexed broadcast receiving apparatus only when said internal counter detects the subframe previously assigned to said FM multiplexed broadcast receiving apparatus; and wherein said controller controls said reception circuit, said detector and said decoder to ordinarily be in an off state, and turns on said reception circuit, said detector and said decoder at a predetermined time before a timing at which the internal counter is expected to detect the predetermined subframe previously assigned to said FM multiplexed broadcast receiving apparatus.

2. The FM multiplexed broadcast receiving apparatus according to claim 1, wherein:

said detector detects the substantial sync signals and the frames in the frame data received by said reception circuit and outputs the block sync signal in synchronism with the blocks and a frame sync signal in synchronism with the frame; and said internal counter is reset by the frame sync signal, counts the block sync signals, and outputs a signal indicating the predetermined subframe while a count value thereof falls within a predetermined range.

3. The FM multiplexed broadcast receiving apparatus according to claim 1, wherein said controller turns on said reception circuit at a timing preceding to a timing at which the internal counter is expected to detect the predetermined subframe by a predetermined time period, and then turns on said decoder.

4. The FM multiplexed broadcast receiving apparatus according to claim 1, wherein said controller turns on said reception circuit at a timing preceding to a timing at which the internal counter is expected to detect the predetermined subframe by at least a sum of a tuning operation period needed from the activation of the reception circuit to receipt of the FM radio wave and a bit clock latching period in the decoder, and turns on said decoder at a timing preceding to a timing at which the internal counter detects the predetermined subframe by at least the bit click latching period in the decoder.

5. The FM multiplexed broadcast receiving apparatus according to claim 4, wherein said controller turns on said reception circuit until said internal counter ends the detection of the predetermined subframe, and turns on said decoder until a time of data processing of said controller passes after the predetermined subframe ends.

6. The FM multiplexed broadcast receiving apparatus according to claim 1, further comprising a display device, and wherein said controller controls said display device based on the data reproduced by said decoder.

7. The FM multiplexed broadcast receiving apparatus according to claim 1, wherein the sum of power consumption of said reception circuit, said decoder, and said detector is greater than that of said controller.

8. An FM multiplexed broadcast receiving apparatus according to claim 1, wherein:

the blocks in the frame data include a service ID code indicating a type of service;

said FM multiplexed broadcast receiving apparatus further includes a service ID code discrimination circuit for discriminating the service ID code, a bus connecting said decoder and said controller, and a memory connected to said bus; and said service ID code discrimination circuit discriminates that the service ID code reproduced by said decoder indicates a paging mode, said controller checks whether the destination address is equal to the address assigned to said FM multiplexed broadcast receiving apparatus, and when the service ID code indicates the paging mode and the destination addresses is equal to the address assigned to the FM multiplexed broadcast receiving apparatus, said controller stores the reproduced data in said memory through the bus.

9. An FM multiplexed broadcast receiving apparatus according to claim 1, wherein said controller turns on said reception circuit, said decoder, and said detector when the count value of said internal counter is shifted from a number of actually received blocks.

10. An FM multiplexed broadcast receiving apparatus according to claim 1, wherein said controller includes a CPU which controls the operation of said reception circuit, said decoder, and said detector, and processes the received data.

11. An FM multiplexed broadcast receiving apparatus according to claim 10, further comprising a display device, and wherein said controller controls said display device based on the received data.

12. An FM multiplexed broadcast receiving apparatus according to claim 10, wherein the sum of power consumption of said reception circuit, said decoder, and said detector is smaller than that of said controller.

13. An FM multiplexed broadcast receiving apparatus according to claim 10, wherein said controller includes a CPU which controls the operation of said reception circuit, said decoder, and said detector, and processes the received data.

14. An FM multiplexed broadcast receiving apparatus for receiving paging service information, comprising:

a reception circuit which receives frame data having a plurality of subframes including a service identification code in the form of information multiplexed on the FM radio wave, each of the subframes including a plurality of blocks each of which includes the service identification code, a substantial sync signal and a data packet;

a decoder which decodes the frame data received by said reception circuit and reproduces the service identification code, the substantial sync signals and data included in the data packets;

a detector which detects the substantial sync signals which are synchronous with the plurality of blocks and generates block sync signals which are synchronous with the plurality of blocks;

a service identification code discriminating circuit which discriminates whether the service identification code reproduced by said decoder indicates a selective paging service, and outputs a discrimination result;

a counter which counts the blocks in the frame data based on the block sync signals generated by said detector and generates an interruption signal when a count value of said counter falls within a predetermined range corresponding to a predetermined subframe which is previously assigned to said FM multiplexed broadcast receiving apparatus and when the discrimination result, output from said service identification code discriminating circuit, indicates that the service identification code indicates a selective paging service; and a control unit which performs data processing operations responsive to receipt of the interruption signal, including determining whether selective call data of a terminal to be paged which is included in the frame data decoded by said decoder matches predetermined selective call data which is previously assigned to said FM multiplexed broadcast receiving apparatus; and wherein said control unit is ordinarily in an off state, and is turned on only when the interruption signal is generated.

15. The FM multiplexed broadcast receiving apparatus according to claim 14, wherein:

said detector detects the substantial sync signals in the frames in the frame data received by said reception circuit and outputs the block sync signal in synchronism with the blocks and a frame sync signal in synchronism with the frame; and said internal counter counts the block sync signals, is reset by the frame sync signal, and outputs a detection signal indicating the predetermined subframe while a count value thereof is within a predetermined range.

\* \* \* \* \*

UNITED STATES PATENT AND TRADEMARK OFFICE
CERTIFICATE OF CORRECTION

PATENT NO. : 5,969,634
DATED : October 19, 1999
INVENTOR(S) : Susumu Takashima et al.

It is certified that error appears in the above-identified patent and that said Letters Patent is hereby corrected as shown below:

Item [56] References Cited, under "U.S. PATENT DOCUMENTS", insert
--5,697,097  12/1997  Reibel et al  455/343--, under "FOREIGN PATENT DOCUMENTS" insert
--0,319,219    6/1989    EPO
  0,622,966   11/1994    EPO
  2,709,907    3/1995    France--.

Signed and Sealed this

Thirty-first Day of July, 2001

*Attest:*

NICHOLAS P. GODICI
*Attesting Officer*   Acting Director of the United States Patent and Trademark Office